(12) United States Patent
Uchikawa (10) Patent No.: US 8,379,242 B2
(45) Date of Patent: Feb. 19, 2013

(54) SERVICE RETRIEVAL METHOD (75) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/469,696

(22) Filed: May 11, 2012

(65) Prior Publication Data

US 2012/0218604 A1 Aug. 30, 2012

Related U.S. Application Data

(62) Division of application No. 11/834,112, filed on Aug. 6, 2007.

(30) Foreign Application Priority Data

Dec. 6, 2006 (JP) .................................. 2006-329924

(51) Int. Cl.
*G06K 15/00* (2006.01)
*G06F 15/00* (2006.01)

(52) U.S. Cl. ........................................ 358/1.14; 358/1.6

(58) Field of Classification Search .................. 358/1.15, 358/1.13, 1.3, 1.9, 2.1, 1.6, 1.14
See application file for complete search history.

(56) References Cited

U.S. PATENT DOCUMENTS

| 6,934,042 B1 * | 8/2005 | Morita et al. ................ 358/1.15 |
| 7,002,702 B1 * | 2/2006 | Machida ........................ 358/1.15 |
| 2002/0041386 A1 * | 4/2002 | Suzuki et al. ................ 358/1.13 |
| 2006/0215219 A1 * | 9/2006 | Yorimoto et al. ............ 358/1.15 |
| 2007/0109577 A1 * | 5/2007 | Yoshida ........................ 358/1.13 |

\* cited by examiner

*Primary Examiner* — Jerome Grant, II
(74) *Attorney, Agent, or Firm* — Canon USA, Inc., IP Division (57) ABSTRACT

A method for searching a device that provides a service from a network connecting a plurality of devices includes detecting whether a document has been set on a scanner. In response to detecting that the document has been set on the scanner, the method searches a device that provides a service which can be used in cooperation with the scanner from among the plurality of devices. In response to detecting that the document has not been set on the scanner, the method searches a device that provides data to be processed from among the plurality of devices.

13 Claims, 7 Drawing Sheets

SERVICE RETRIEVAL METHOD

CROSS REFERENCE TO RELATED APPLICATIONS

The present application is a divisional of U.S. patent application Ser. No. 11/834,112, filed on Aug. 6, 2007, which claims priority from Japanese Patent Application No. 2006-329924, filed Dec. 6, 2006, all of which are hereby incorporated by reference herein in their entirety.

BACKGROUND OF THE INVENTION

1. Field of the Invention

The present invention relates to the technique of retrieving a service on a network.

2. Description of the Related Art

In general, the ability to retrieve services on a network is known. When retrieving a service on a network, a user specifies the type and/or feature of the service as a retrieving condition and retrieves the service (for example, see Japanese Patent Laid-Open No. 2001-109693).

However, it is difficult to detect the types of services on a network and to detect which services are available. All the services on the network can be retrieved and presented to a user. In this case, however, all the services including those that the user does not intend to use are retrieved and presented to the user. Thus, the user has difficulty in specifying the service to use.

SUMMARY OF THE INVENTION

According to an aspect of the present invention, a method for searching a device that provides a service from a network connecting a plurality of devices includes detecting whether a document has been set on a scanner, and searching a device that provides a service which can be used in cooperation with the scanner from among the plurality of devices in response to detecting that the document has been set on the scanner, and searching a device that provides data to be processed from among the plurality of devices in response to detecting that the document has not been set on the scanner.

Further features of the present invention will become apparent from the following description of exemplary embodiments with reference to the attached drawings.

DESCRIPTION OF THE EMBODIMENTS

With reference to the drawings, an exemplary embodiment of the present invention will be described in detail below. The elements described in the embodiment are only exemplary, and are not intended to restrict the scope of the present invention.

Figure 1:
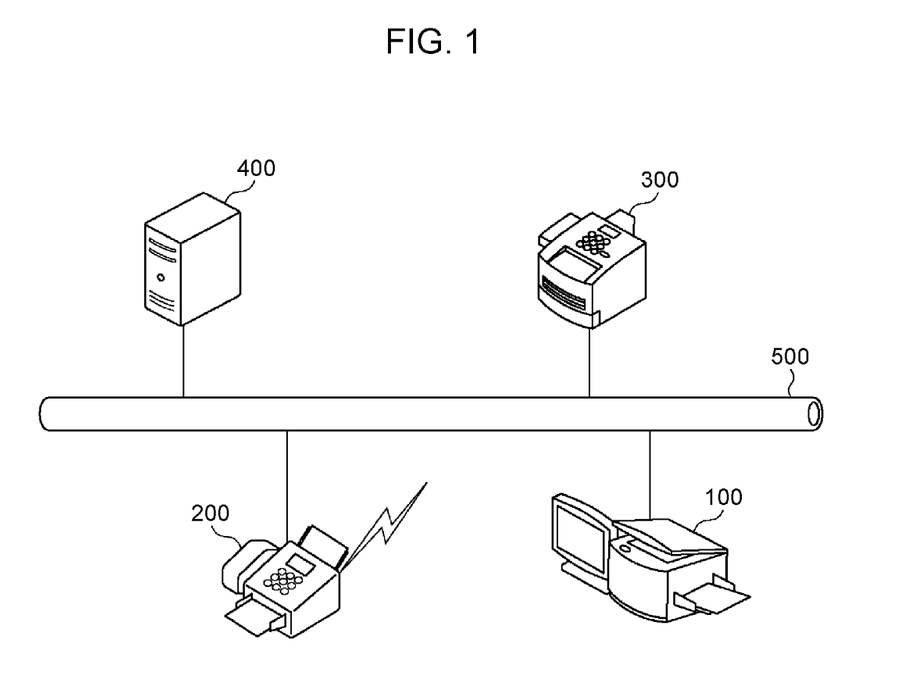
FIG. 1 is a diagram of the structure of a network to which an information processing system according to an embodiment of the present invention is applicable.

FIG. 1 illustrates an exemplary structure of a network according to the present embodiment. An information processing system 100 is configured to retrieve a service and includes a retrieval program for retrieving an external service and a client program for using the external service. The information processing system 100 is a multifunctional apparatus based on a copier and also functions as a server for providing services to other apparatuses connected to a network 500.

A device 200 provides facsimile services for performing facsimile communication via an available telephone line. The facsimile services provided by the device 200 conform to a facsimile standard in accordance with the International Telecommunication Union Telecommunication Standardization Sector (ITU-T) Recommendation, such as G3-FAX or G4-FAX. A device 300 provides print services, including color print services that can be used by the information processing system 100.

A device 400 provides storage services that can be used by the information processing system 100. The storage services include a service for storing and managing documents sent from a client and a service for outputting, among the stored and managed documents, a document specified by the client to a specific printer. The above-described devices are connected to the network 500 and can communicate with one another.

Figure 2:
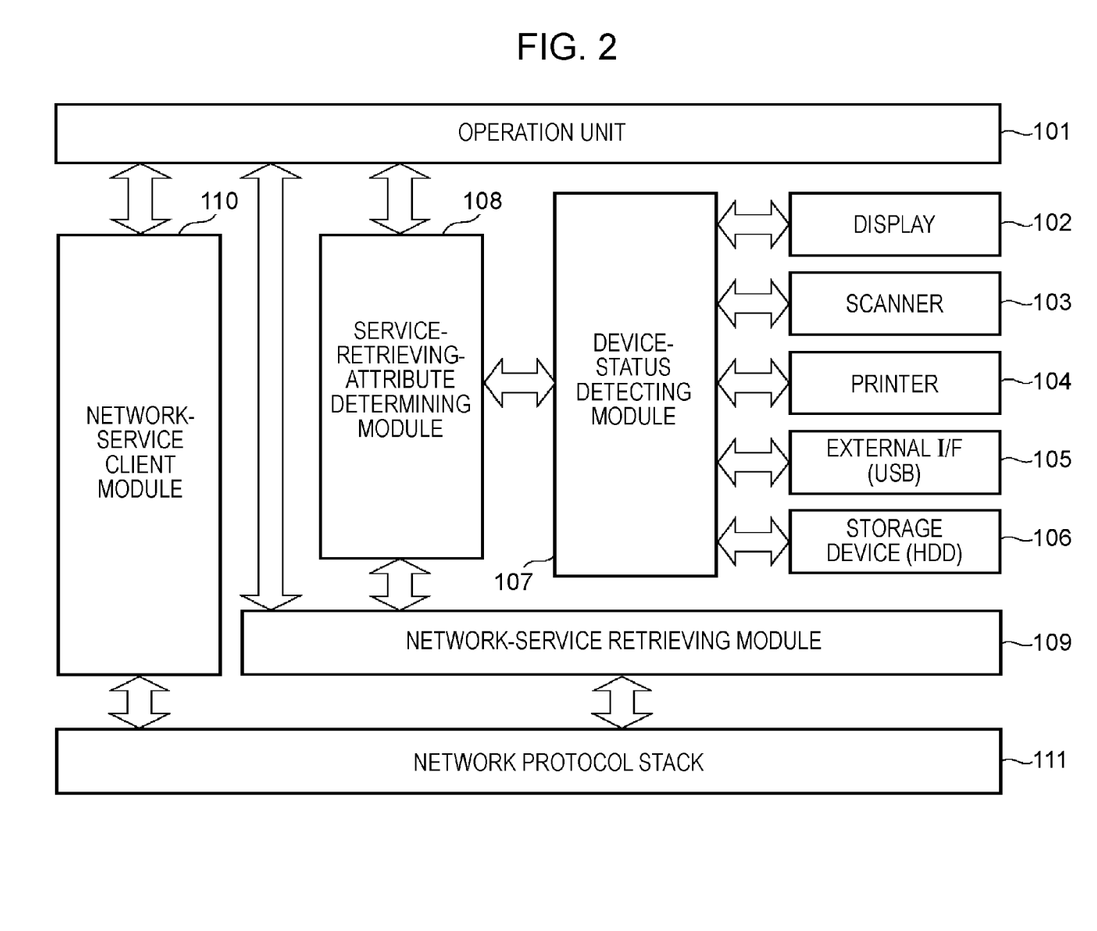
FIG. 2 is a block diagram of internal modules of the information processing system according to the embodiment.

FIG. 2 is a block diagram of internal modules of the information processing system 100. An operation unit 101 allows a user to enter an operation to the information processing system 100. A display 102 displays information provided by the information processing system 100 to the user. A scanner 103 reads an image on a document set by the user. More specifically, the scanner 103 reads images on documents conveyed on a page-by-page basis from a document-conveying device to a scanning position. Alternatively, instead of using the document-conveying device, a document placed on a document plate is read by the scanner 103. The scanner 103 can detect that a document has been set on the document-conveying device or that a document has been placed on the document plate. Known techniques are used to implement the specific detection.

A printer 104 prints data received from a network or an image corresponding to a document read by the scanner 103. An external interface (I/F) 105 is, for example, a Universal Serial Bus (USB) or FireWire (IEEE 1394). Using the external I/F 105, a connection with another device, such as a digital camera or a digital video camera, can be established. A storage device 106 stores image data obtained by reading an image on a document using the scanner 103. The storage device 106 is also used as a spooler for print data. The scanner 103, the printer 104, the external I/F 105, and the storage device 106 function as information processing apparatuses included in the information processing system 100.

A device-status detecting module 107 detects the status of each of the above-described devices. A service-retrieving-attribute determining module 108 is a module configured to analyze information set by the user via a user interface (UI) and generate a service-retrieving condition based on the analyzed information. The retrieving condition can be set in the following two ways: automatic setting by the service-retrieving-attribute determining module 108; or asking the user about a retrieving attribute and allowing entry and setting by the user.

A network protocol stack 111 is a module with a function of sending and receiving data via the network 500. A network-service-retrieving module 109 is a module configured to retrieve a service on the network 500 using a retrieving attribute determined by the service-retrieval-attribute determining module 108. A network-service client module 110 is a module configured to use a service on the network 500. That is, the network-service client module 110 uses a network service by using preset information specified by a UI module of the operation unit 101.

Figure 3:
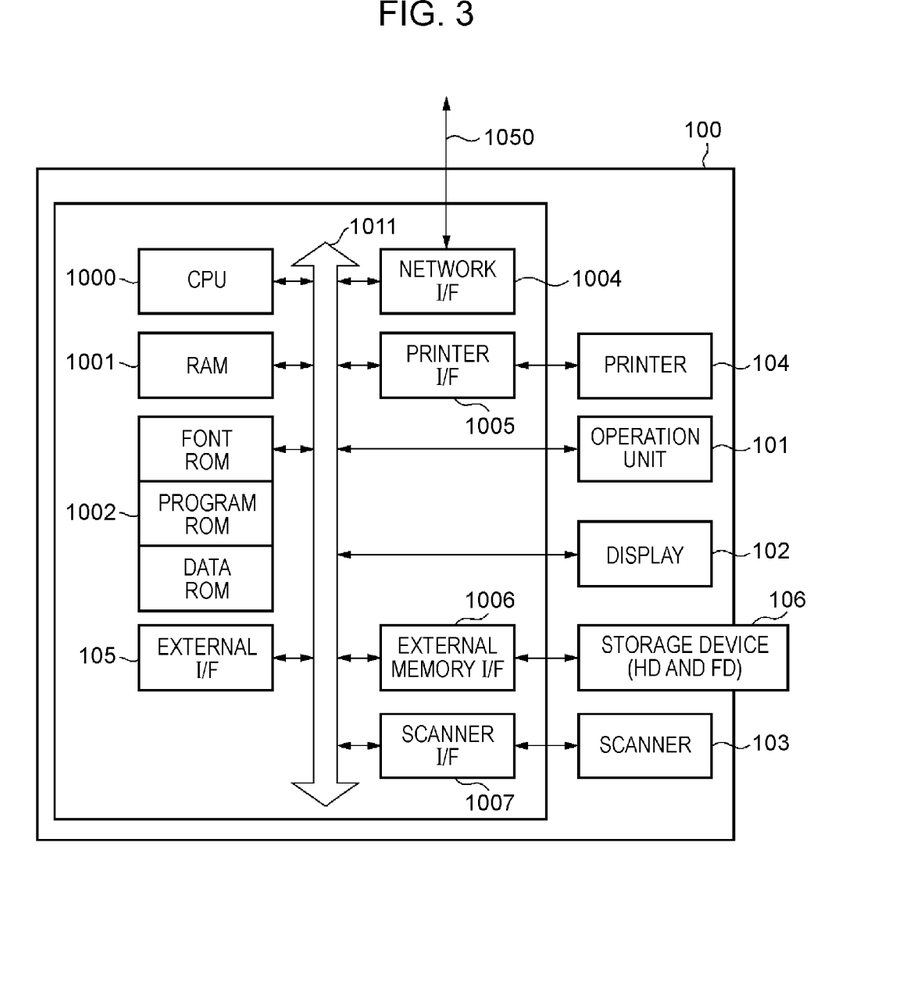
FIG. 3 is a block diagram of hardware in the information processing system according to the embodiment.

FIG. 3 is a block diagram of hardware in the information processing system 100. A central processing unit (CPU) 1000 controls the entire system based on a control program stored in a program read-only memory (ROM) of a ROM 1002 or a control program stored in an external memory (not shown). The CPU 1000 outputs an image signal serving as output information to the printer 104 via a printer I/F 1005 connected to a system bus 1011. The CPU 1000 receives an image signal from the scanner 103 via a scanner I/F 1007 connected to the system bus 1011 and stores the image signal in a data ROM of the ROM 1002 or the storage device 106. Alternatively, the image signal is sent to a network 1050 via a network I/F 1004.

The ROM 1002 includes the program ROM, a font ROM, and the data ROM. The program ROM of the ROM 1002 stores a control program executed by the CPU 1000. The font ROM of the ROM 1002 stores font data used to generate output information corresponding to character code. The data ROM of the ROM 1002 stores information used in a client in the case where the information processing system 100 has no storage device, such as a hard disk, etc.

The CPU 1000 is connected to the network 1050 via the network I/F 1004 and can communicate with other apparatuses located on the network 1050. A random access memory (RAM) 1001 functions as a main memory or a work area for the CPU 1000. The RAM 1001 can extend the memory capacity using an option RAM connected to an expansion port (not shown). The RAM 1001 is used as an output-information expanding area, an environment-data storage area, a nonvolatile RAM (NVRAM), etc.

Access to the storage device 106 is controlled by an external memory I/F 1006. The storage device 106 is connected as an option and stores font data, an emulation program, form data, etc. The number of the storage device(s) 106 is not limited to one, and multiple storage devices 106 may be connected. The operation unit 101 is an operation panel on which switches, buttons, etc. for allowing entry of operations and a light-emitting diode (LED) display are arranged. The storage device 106 may include an NVRAM (not shown) and store mode-setting information entered via the operation unit 101.

Figure 4:
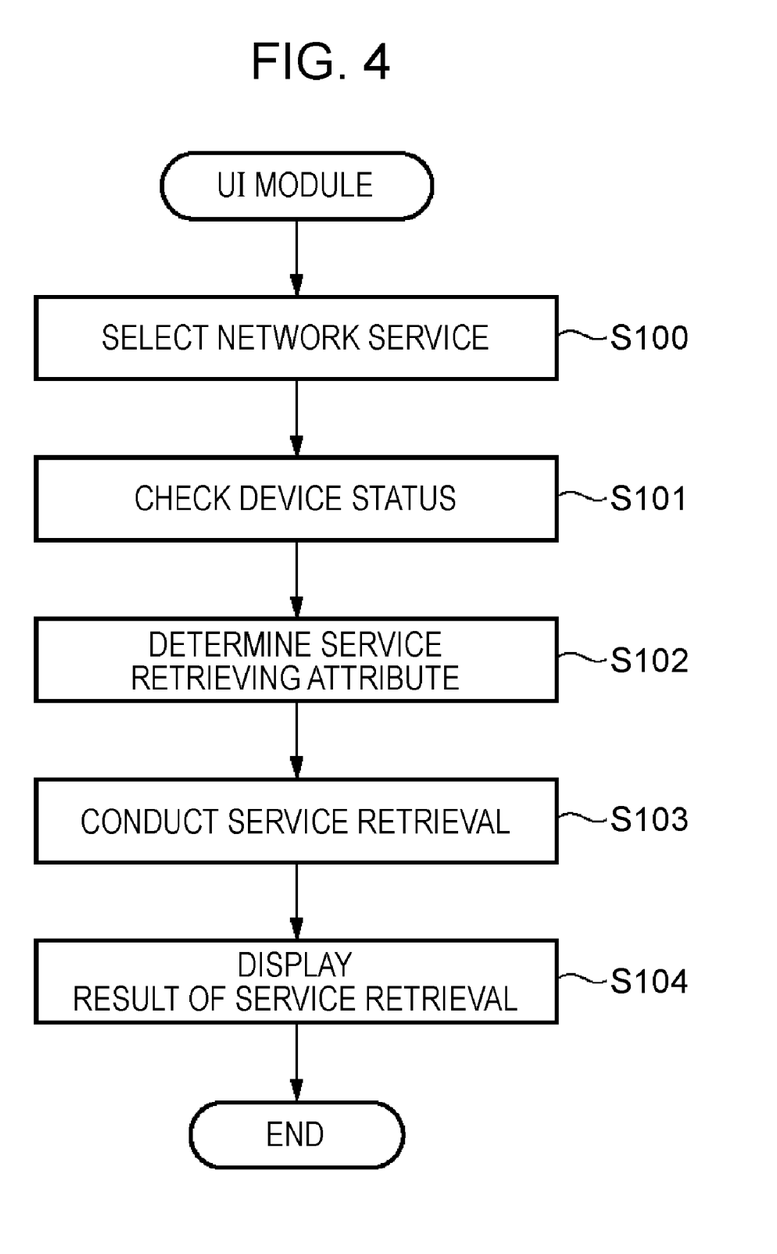
FIGS. 4 and 5 are flowcharts of processes performed in the information processing system according to the embodiment.

FIG. 4 is a flowchart of an exemplary service-retrieving process. When a user selects, for example, a "network service" button displayed on the operation unit 101 (S100), the information processing system 100 checks the status of each of the devices included in the information processing system 100 (S101). The devices include, but are not limited to, the scanner 103, the printer 104, and a USB device connected via the external I/F 105.

After checking the status of each device, the process determines service-retrieving attributes in accordance with the checked statuses (S102). The service-retrieving attributes determined in step S102 include attributes of each service, including service type information such as "print service" or "facsimile service", and specific service details, such as "color" or "G4-FAX". The information processing system 100 uses the determined service-retrieving attributes to conduct service retrieval (S103). As a result of the service retrieval, detected service information is displayed on the operation unit 101 (S104), and the process flow ends.

Figure 5:
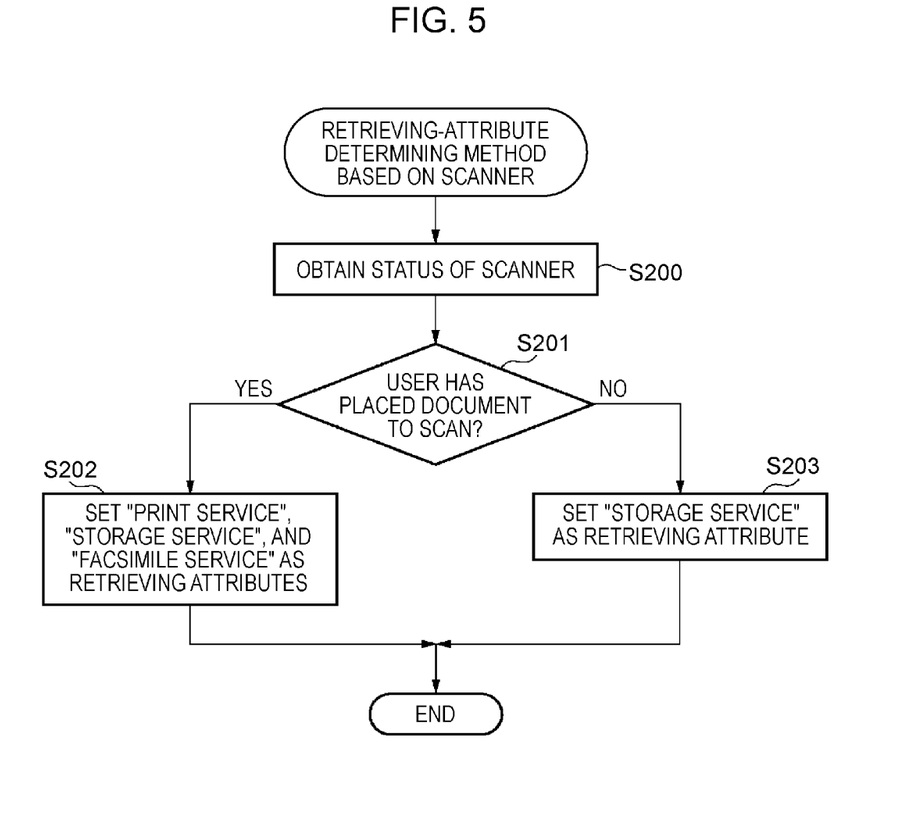

FIG. 5 is a flowchart of a process of determining a service-retrieving attribute based on the status of the scanner 103. This process is performed by executing, by the CPU 1000, a retrieval control program stored in the ROM 1002.

In the case where the above-described "network service" button is selected, the CPU 1000 obtains the status of the scanner 103 (S200) and determines whether the user has already set a document on the scanner 103 (S201). More specifically, the CPU 1000 determines whether a document has been set on the document-conveying device or on the document plate. In the case where a document has been set on the scanner 103, the CPU 1000 predicts that the user will use a service provided by the scanner 103 and sets a service-retrieving attribute (S202). Services that can be provided by the scanner 103 include, for example, "print service", "storage service", and "facsimile service". The print service allows printing of an image based on image data obtained by reading an image on a document using the scanner 103 (hereinafter the obtained image data is referred to as "the scanned image data"). The storage service allows saving of the scanned image data as a file. The facsimile service allows transmission of the scanned image data via facsimile.

In the case where it is determined in step S201 that no document to be scanned has been set, the CPU 1000 predicts that the user will use a service not provided by the scanner 103 and sets a service-retrieving attribute (S203). A non-scanner related service is the "storage service" allowing obtaining or printing of a file specified from among multiple files saved in another device. A service to retrieve is specified in this manner, and the process flow ends.

Based on a retrieving condition determined based on the status of a device, a service on the network is retrieved, and, as a result of the retrieval, a detected service is presented to the user. Retrieval methods include protocols for detecting a service on a network using multicast communication. More specifically, the protocols include, but are not limited to, the Service Location Protocol (SLP) and Web Services Dynamic Discovery (WS-Discovery). Alternatively, multicast DNS (mDNS) or Simple Service Discovery Protocol (SSDP) may be used.

Further, a service may be retrieved using a registry, such as the Lightweight Directory Access Protocol (LDAP) or the Universal Description, Discovery, and Integration (UDDI). Alternatively, services on the network may be retrieved and cached without specifying retrieving conditions, and services that best satisfy the condition are selected from the cached information, whereby the selected information may be presented to the user. This cache may be performed, for example, in the case where the information processing system 100 is activated, or the information processing system 100 performs no processing for a predetermined period of time.

Figure 6:
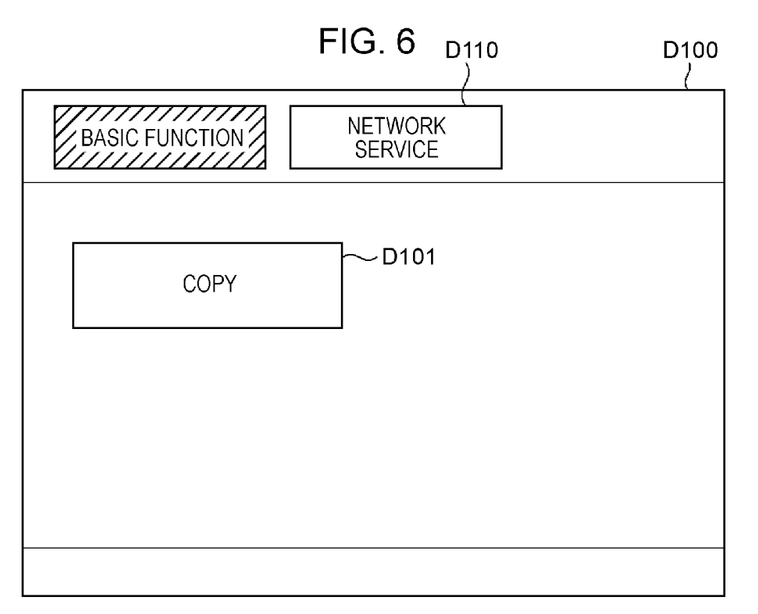
FIGS. 6 through 8 illustrate a user interface in the information processing system according to the embodiment.

FIG. 6 illustrates a basic screen of the information processing system 100. A screen D100 is a screen that enables a user to select an available function. In this case, only a copy button D101 for copying a document set by the user is displayed. A "network service" button D110 for using a service on the network is placed as a menu item on the screen.

Figure 7:
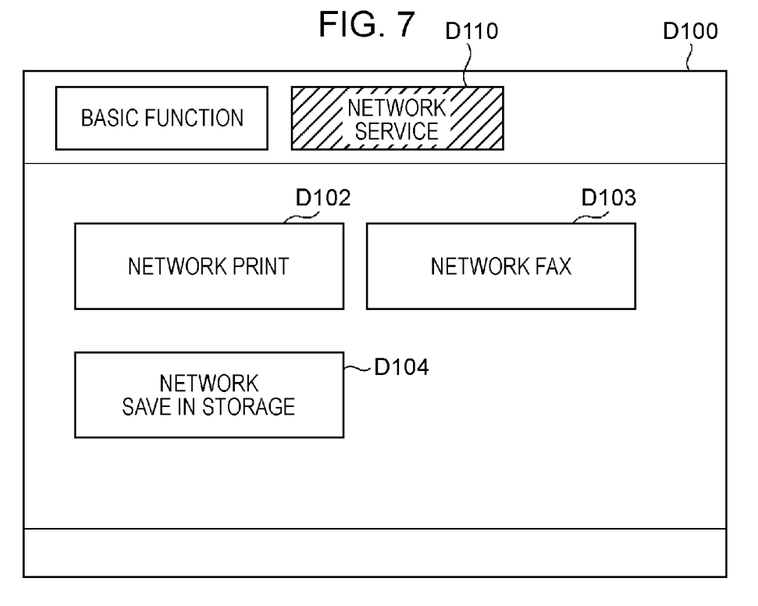

In the case where, while a document is set on the scanner 103, the "network service" button D110 is selected, a UI screen illustrated in FIG. 7 is displayed on the display 102. Whether a document has been placed is determined by, for example, whether a document has been set on an auto document feeder (ADF) or on a document plate.

In the case where, while the document has been set on the scanner 103, the "network service" button D110 has been selected, a service provided by the scanner 103 is retrieved. In this case, without the user entering the retrieving condition requiring that a service should be provided by the scanner 103, this condition is added to the retrieving condition(s)

simply by setting the document. As a result, the print service, facsimile service, and storage service are detected. Services D102 through D104 are displayed such that the user can select these services.

In the case where the print service D102 is selected, image data based on a document read by the scanner 103 (hereinafter referred to as the "scanned image data") is sent to a device that can perform the print service D102 via the network I/F 1004, whereby the device prints the scanned image data.

In the case where the facsimile service D103 is selected, the user is prompted to specify a destination address, and the scanned image data is sent to a device that can perform the facsimile service D103 via the network I/F 1004, whereby the device sends the scanned image data to the specified destination address via facsimile. In the case where the storage service D104 is selected, the scanned image data is sent to a device that can perform the storage service D104 via the network I/F 1004, whereby the device stores the scanned image data in a predetermined file.

With respect to the above-described services, in the case where multiple devices that can perform each of the services are connected to the network, additional information for identifying the devices is displayed, and the user (or operator) selects one of the devices to perform the corresponding service.

In the case where, while a document has been set on the scanner 103 in the above-described manner, a network service that can be provided by the scanner 103 is retrieved, if a feature of the document can be detected, this feature of the document may also be used as a service-retrieving attribute. Features of the document include, but are not limited to, a paper size of the document and color information (e.g., color or monochrome) of an image on the document. More specifically, in the case where the CPU 1000 detects that the paper size of a document set on the scanner 103 is A3 size, the condition requiring that a service should be able to handle A3-size image data is added as a retrieving condition.

In the case where an image of a document is a color image, the condition requiring that a service should be able to handle color image data is added as a retrieving condition. In retrieving network services that can be provided by the scanner 103, besides the availability of the print service, facsimile service, and storage service, whether A3-image data can be handled and whether color image data can be handled serve as retrieving conditions.

Figure 8:
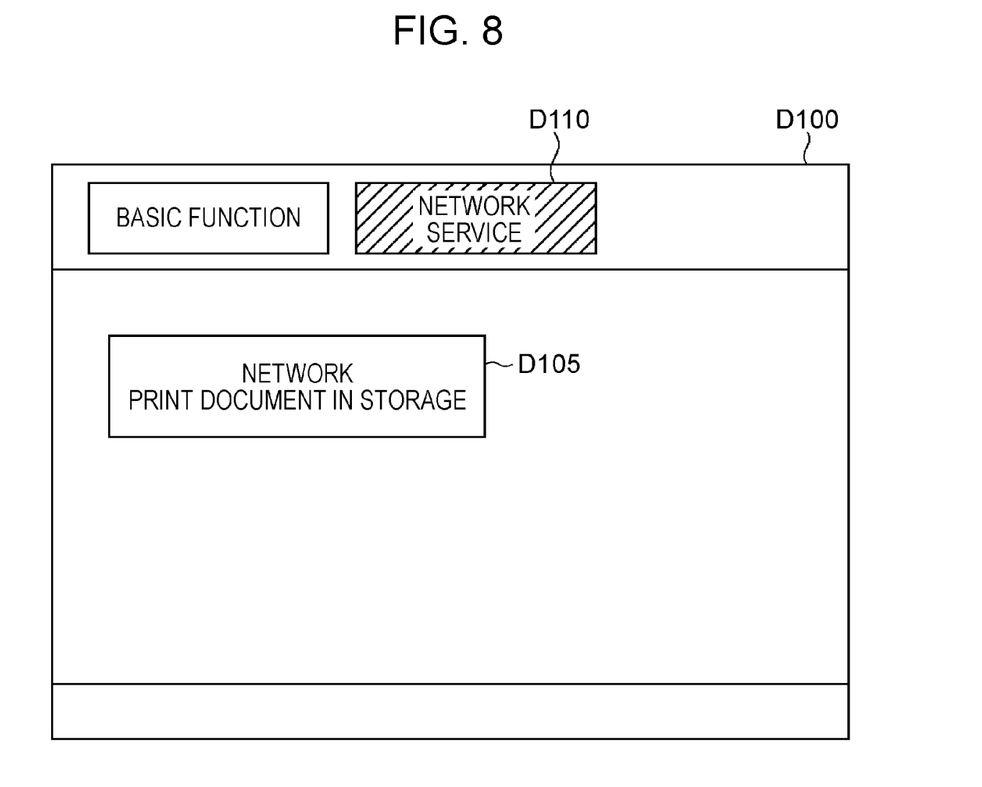

In the case where, while no document has been set on the scanner 103, the "network service" button D110 illustrated in FIG. 6 has been selected, the CPU 1000 displays a UI screen illustrated in FIG. 8 on the display 102. In the case where, while no document has been set on the scanner 103, the "network service" button D110 has been selected, non-scanner related services that can be provided are retrieved. As a result, a storage service on the network is detected, and hence, a button D105 for giving an instruction to print a document stored in the storage is displayed.

More specifically, in the case where, while no document has been set on the scanner 103, services on the network are to be retrieved, non-scanner related services that can be provided are retrieved. Such services include, but are not limited to, a print service which is a function performed in the information processing system 100 to print a document saved in another device on the network. In addition, such services include a device-information setting service of obtaining, by the information processing system 100, preset information set on another device on the network. The print service allows easy printing of a document saved in another device, whereby the document can be obtained. The device-information setting service allows application of the same setting (e.g., print setting) as that of another device to the information processing system 100.

According to the present embodiment, an information processing system automatically retrieves a service needed by a user without the user entering service-retrieving conditions, and the retrieval result is presented to the user. More specifically, the status of a device in the information processing system is detected, and a user operation is predicted based on the detected status. Based on the predicted user operation, services on the network that may be used by the user are retrieved and presented to the user. Accordingly, the user's task of entering service-retrieving conditions for conducting service retrieval can be omitted, and, thus, the usability of the information processing system is improved.

In this manner, services that may not be available because of the status of a device or services that are less likely to be used by the user are not retrieved. Hence, a service as desired by the user can be easily selected.

Although the retrieving conditions are changed in accordance with the status of the scanner 103 in the above-described embodiment, the present invention is not limited thereto. For example, retrieval may be conducted in accordance with the status of the printer 104 printing data on paper, the storage device 106 storing electronic data, and/or the external I/F 105 for establishing connection with a peripheral device.

More specifically, the retrieving conditions may be set based on whether the printer 104 is operating normally or whether another device is connected to the external I/F 105.

That is, in the case where the printer 104 in the information processing system 100 is in an error status in which printing cannot be done, such as when a paper jam is detected in the printer 104 or the printer 104 is detected to be out of toner, ink, and/or paper, print services on the network are retrieved. Accordingly, an alternate printer can be easily detected.

Whether another device is connected to the external I/F 105 is detected, and, in the case where another device is connected to the external I/F 105, service-retrieving attributes are determined based on the type and/or status of the device connected to the external I/F 105. For example, in the case where a digital camera is connected to the external I/F 105, retrieving attributes for retrieving a storage service of obtaining data stored in the digital camera and storing the data in an external storage device or a print service of printing the data in the digital camera are set.

Instead of determining service-retrieving conditions in the information processing system 100, the network may be informed of the current status of a device, and services that can be provided to a device in that status may be retrieved. For example, the network is informed of the status in which a document has been set on the scanner 103, and it is determined whether each device on the network informed thereof can provide an appropriate service. In the case where there is a device that can provide an appropriate service, the appropriate service may be presented.

The present invention may be applied to a system including multiple devices or an apparatus including a single device. The present invention may also be achieved by directly or remotely providing a program implementing the features of the above-described embodiment to a system or apparatus such that the system or apparatus reads and executes the program code. The technical scope of the present invention also includes the program code itself installed in a computer to implement the processing features of the present invention on the computer.

In this case, the form of program is not limited, as long as it functions as a program. More specifically, the program code may be object code, a program executed by an interpreter, script data supplied to an operating system (OS), etc. Recording media for supplying the program include, but are not limited to, a floppy disk, a hard disk, an optical disk, a magneto-optical (MO) disk, a compact-disc read-only memory (CD-ROM), a CD recordable (CD-R), a CD rewritable (CD-RW), a magnetic tape, a non-volatile memory card, a ROM, and a digital versatile disc (DVD) (including DVD-ROM and DVD-R).

Alternatively, the program may be obtained by accessing a site on the Internet using a browser on a client personal computer (PC) and downloading a program according to an embodiment of the present invention or a file including the program and an automatic install function from the site to a recording medium, such as a hard disk. Alternatively, program code of the program according to the embodiment of the present invention may be divided into a plurality of files, and the files may be downloaded from different homepages. That is, a World Wide Web (WWW) server that allows multiple users to download a program for implementing the processing functions of the present invention falls within the scope of the present invention.

Furthermore, the program according to the embodiment of the present invention may be encrypted and stored on a storage medium, such as a CD-ROM, for distribution to a user. A user that satisfies a predetermined condition(s) is allowed to download key information for decrypting the program from a homepage via the Internet, and, using the key information, the user may execute the encrypted program and install the program into a computer, thereby implementing the processing functions of the program.

The functions of the above-described embodiment may be implemented by an OS or the like running on a computer executing part or entire actual processing in accordance with an instruction of the program.

Furthermore, the case in which a program according to an embodiment of the present invention is written into a memory included in a function expansion board of the PC, and a CPU included in the function expansion board executes part or entire actual processing in accordance with the program also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method for searching a network connecting a plurality of devices for a device that provides a service, the method comprising:
    detecting whether a document has been set on a scanner; and
    searching, in response to detecting that the document has been set on the scanner and prior to obtaining scanner image data from reading the document by the scanner, the plurality of devices for a device that provides a service that is configured to be used in cooperation with scanner image data that is predicted to result from reading the document set on the scanner, and searching, in response to detecting that the document has not been set on the scanner, the plurality of devices for a first device that provides data to be processed by a second device that is not the scanner.

2. The method according to claim 1, wherein, in response to additionally detecting a feature of the document set on the scanner, searching includes using the features as a service retrieving condition to search for a device that provides a service that is configured to be used in cooperation with the scanner image data.

3. The method according to claim 2, wherein the feature of the document includes at least a paper size of the document, type of the document, and a color of an image on the document.

4. The method according to claim 1, further comprising: displaying information indicating a service provided by a device located by searching the plurality of devices for a device that provides a service that is configured to be used in cooperation with scanner image data that is predicted to result from reading the document set on the scanner.

5. The method according to claim 4, wherein, in response to the plurality of devices being searched, displaying is performed such that a user can identify each search located device of the searched plurality of devices.

6. The method according to claim 1, wherein, in response to detecting that the document has been set on the scanner, searching includes searching the plurality of devices for a printing device that provides a printing service that is configured to be used in cooperation with scanner image data that is predicted to result from reading the document set on the scanner.

7. The method according to claim 1, wherein searching, in response to receiving instruction from a user to search for a device where the instructions do not include a user's input of a condition for searching for the device, for a device is performed after accepting the user instruction and without receiving the user's input of any condition for searching for a device.

8. The method according to claim 1, further comprising: controlling a device located by searching the plurality of devices to execute a service provided by the located device.

9. The method according to claim 1, wherein the service that is configured to be used in cooperation with scanner image data that is predicted to result from reading the document set on the scanner includes any one of a print service for printing image data obtained by performing reading of the document by the scanner, a storage service for storing the image data obtained by performing reading of the document by the scanner, and an information transmitting service for transmitting the image data obtained by performing reading of the document by the scanner.

10. A non-transitory computer-readable storage medium storing a program causing an information processing apparatus to perform the method according to claim 1.

11. An information processing system comprising:
    a network connecting a plurality of devices;
    a detecting unit configured to detect whether a document has been set on a scanner; and
    a searching unit configured to search, in response to the detecting unit detecting that the document has been set on the scanner and prior to obtaining scanner image data from reading the document by the scanner, the plurality of devices for a device that provides a service that is configured to be used in cooperation with scanner image data that is predicted to result from reading the document set on the scanner, and configured to search, in response to the detecting unit detecting that the document has not been set on the scanner, the plurality of devices for a first device that provides data to be processed by a second device that is not the scanner.

12. An information processing apparatus for searching a network connecting a plurality of devices for a device that provides a service, the information processing apparatus:
- a detecting unit configured to detect whether a document has been set on a scanner; and
- a searching unit configured to search, in response to the detecting unit detecting that the document has been set on the scanner and prior to obtaining scanner image data from reading the document by the scanner, the plurality of devices for a device that provides a service that is configured to be used in cooperation with scanner image data that is predicted to result from reading the document set on the scanner, and configured to search, in response to the detecting unit detecting that the document has not been set on the scanner, the plurality of devices for a first device that provides data to be processed by a second device that is not the scanner.

13. The information processing apparatus according to claim 11, further comprising:
- a service-retrieving-attribute determining unit configured to automatically set, in response to the detecting unit detecting that the document has been set on the scanner and then receiving instruction from a user to search for a device where the instructions do not include a user's input of a condition for searching for the device, a service retrieving condition to search the plurality of devices for a device that provides a service, wherein the service retrieving condition is set prior to obtaining scanner image data from reading the document by the scanner.

* * * * *